United States Patent
Taylor

(10) Patent No.: US 8,319,738 B2
(45) Date of Patent: Nov. 27, 2012

(54) TOUCHSCREEN MODULE

(75) Inventor: Michael Taylor, Dundee (GB)

(73) Assignee: NCR Corporation, Duluth, GA (US)

( * ) Notice: Subject to any disclaimer, the term of this patent is extended or adjusted under 35 U.S.C. 154(b) by 530 days.

(21) Appl. No.: 12/396,920

(22) Filed: Mar. 3, 2009

(65) Prior Publication Data

US 2010/0225597 A1  Sep. 9, 2010

(51) Int. Cl.
  *G06F 3/041* (2006.01)
  *G06K 11/06* (2006.01)
  *G08C 21/00* (2006.01)
(52) U.S. Cl. ................ 345/173; 178/18.01
(58) Field of Classification Search .......... 345/173
  See application file for complete search history.

(56) References Cited

U.S. PATENT DOCUMENTS

| | | | | |
|---|---|---|---|---|
| 5,812,446 A * | 9/1998 | Tailliet | ............ | 365/185.04 |
| 8,046,685 B2 * | 10/2011 | Kishi | ............ | 715/702 |
| 2004/0039927 A1 * | 2/2004 | Hazama et al. | ............ | 713/189 |
| 2004/0085283 A1 * | 5/2004 | Wang | ............ | 345/100 |
| 2006/0125797 A1 * | 6/2006 | Whytock | ............ | 345/173 |
| 2006/0209041 A1 * | 9/2006 | Studt et al. | ............ | 345/173 |
| 2008/0036742 A1 * | 2/2008 | Garmon | ............ | 345/173 |

* cited by examiner

*Primary Examiner* — Joseph Haley
*Assistant Examiner* — Nicholas Lee
(74) *Attorney, Agent, or Firm* — Dana T. Hustins

(57) ABSTRACT

A touchscreen module comprises a display for presenting information to a user of the touchscreen module; a touch panel mounted in overlapping relationship with the display; a touch panel controller coupled to the touch panel for detecting a point on the touch panel touched by the user; and non-volatile memory associated with the display. The non-volatile memory includes a first memory portion for storing information relating to the display, and a second memory portion for storing calibration data relating to the touch panel, thereby enabling calibration data to be retrieved from the touchscreen module when the touchscreen module is installed in a terminal.

9 Claims, 3 Drawing Sheets

STORING
CALIBRATION PARAMETERS

USING
CALIBRATION PARAMETERS

TOUCHSCREEN MODULE

FIELD OF INVENTION

The present invention relates to improvements in or relating to a touchscreen module.

BACKGROUND OF INVENTION

Touchscreen modules comprise touch sensitive panels superimposed over a display, so that a user can select an object (for example, text or graphics) presented on the display by touching the corresponding point on the touch sensitive panel. A touch panel controller ascertains co-ordinates of a point touched by the user and provides the co-ordinates of this point to an operating system.

A touchscreen module can be based on any one of a variety of different technologies, such as resistive, capacitive, surface acoustic wave, and the like. Irrespective of the technology used, all touchscreen modules require to be calibrated so that an application can correlate a position touched on the touch panel with an element presented on the display. This calibration process is usually performed before the touchscreen module is used, and may also be performed at time intervals if the touch panel calibration is prone to drifting. The calibration process results in calibration parameters that are stored in an operating system registry. These calibration parameters are used to compensate for any offset between an actual point touched and point sensed by the touch panel controller.

When a new touchscreen module is installed in a terminal, such as an automated teller machine (ATM), then the touch panel must be calibrated, which is inefficient and time consuming. Furthermore, variations between touchscreen modules may be so great that the calibration parameters for one touchscreen module, when applied to a new touchscreen module, may make it very difficult for a person to use the new touchscreen module even to initiate the calibration process.

Some touchscreen modules include a special non-volatile memory associated with the touch panel for storing the calibration parameters so that a newly-installed touchscreen module does not need to be calibrated. However, these touchscreen modules may not be compatible with some hardware and software used in the terminal in which the touchscreen module is mounted.

It is among the embodiments of an embodiment of the present invention to be able to store calibration parameters without requiring a special non-volatile memory associated with the touch panel.

SUMMARY OF INVENTION

Accordingly, the invention generally provides methods, systems, apparatus, and software for storing calibration parameters in a non-volatile memory associated with a display.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a touchscreen module comprising:
a display for presenting information to a user of the touchscreen module;
a touch panel mounted in overlapping relationship with the display;
a touch panel controller coupled to the touch panel for detecting a point on the touch panel touched by the user; and
non-volatile memory associated with the display and including a first memory portion for storing information relating to the display, and a second memory portion for storing calibration data relating to the touch panel.

The non-volatile memory associated with the display may comply with the Extended Display Identification Data (EDID) data structure. The non-volatile memory may store information relating to manufacturer name, product type, timings supported by the display, display size, luminance data, and the like.

The non-volatile memory may store at least 256 bytes of data and may comply with the EDID 2.0 specification. In such embodiments, the non-volatile memory may have an extension flag set to zero indicating that only 128 bytes are used (the first memory portion), and the next 128 bytes (or part thereof) may be used for storing the calibration data (the second memory portion). This ensures that a display or graphics card driver will not report the contents of the next 128 bytes (the second memory portion). By relying on a memory portion that is invisible to the display controller because an extension flag is not set, conventional display software does not access the calibration parameters.

The non-volatile memory may be a serial PROM or an EEPROM compatible with an $I^2C$ bus.

By virtue of this aspect, touch panel calibration parameters may be stored in the touchscreen module when the touchscreen module is manufactured so that when the touchscreen module is installed in a terminal, the calibration parameters can be read from the touchscreen module without having to implement a calibration process.

By storing the calibration parameters in a memory associated with the display (rather than in a memory associated with the touch panel), the touch panel controller does not need to be altered.

According to a second aspect there is provided a method of storing calibration data for a touch panel in a touchscreen module, the method comprising:
setting a flag in a non-volatile memory associated with a display to indicate that a second memory portion of the non-volatile memory is not used for storing display information;
implementing a calibration process to ascertain calibration parameters; and
storing the ascertained calibration parameters in the second memory portion, where the first memory portion stores display information.

The method may further comprise reading the ascertained calibration parameters from the second memory portion and providing the read calibration parameters to an operating system in request to a response therefor.

According to a third aspect there is provided a terminal including a touchscreen module according to the first aspect.

The terminal may be a self-service terminal. The self-service terminal may be an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

The terminal may include a platform incorporating an operating system. The terminal may include an application that communicates with one or more drivers for a display adapter (also referred to as a graphics card) and/or display to request information from, and write information to, the second memory portion.

These and other aspects will be apparent from the following specific description, given by way of example, with reference to the accompanying drawings.

DETAILED DESCRIPTION

Figure 1:
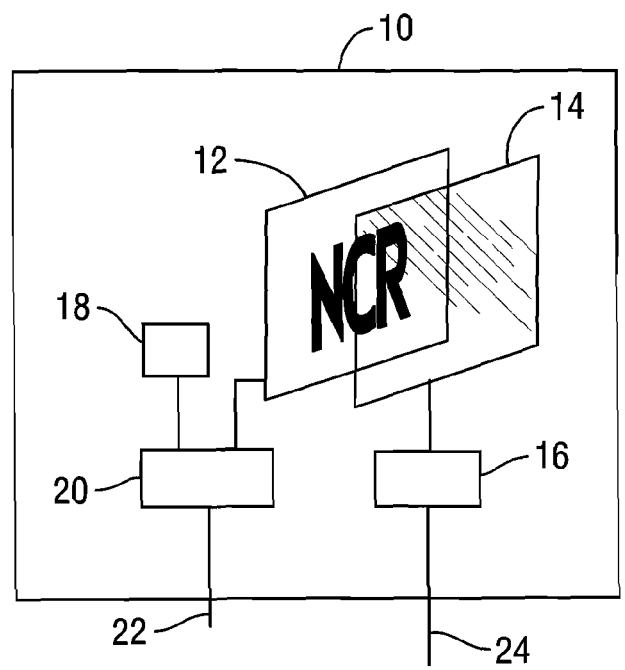
FIG. 1 is a schematic diagram of a touchscreen module according to one embodiment of the present invention.

Reference is first made to FIG. 1, which is a schematic diagram of a touchscreen module 10 according to one embodiment of the present invention. The touchscreen module 10 comprises: a display 12, a transparent touch panel 14 mounted in overlapping relationship with the display 12 so that the touch panel 14 is in registration with the display 12, a touch panel controller 16 in communication with the touch panel 14, and a serial EEPROM (electrically erasable programmable read only memory) 18 associated with the display 12.

The EEPROM 18 and the display 12 are both coupled to a graphics port (in the form of a VGA or DVI compatible interface) 20. This enables a software application to send data and instructions to both the display 12 and the EEPROM 18 via a conventional VGA or DVI cable 22. The touch panel controller 16 is separate from the display 12 and EEPROM 18 and is coupled to a terminal (not shown in FIG. 1) by a data bus (in the form of a USB connection) 24.

Figure 6:
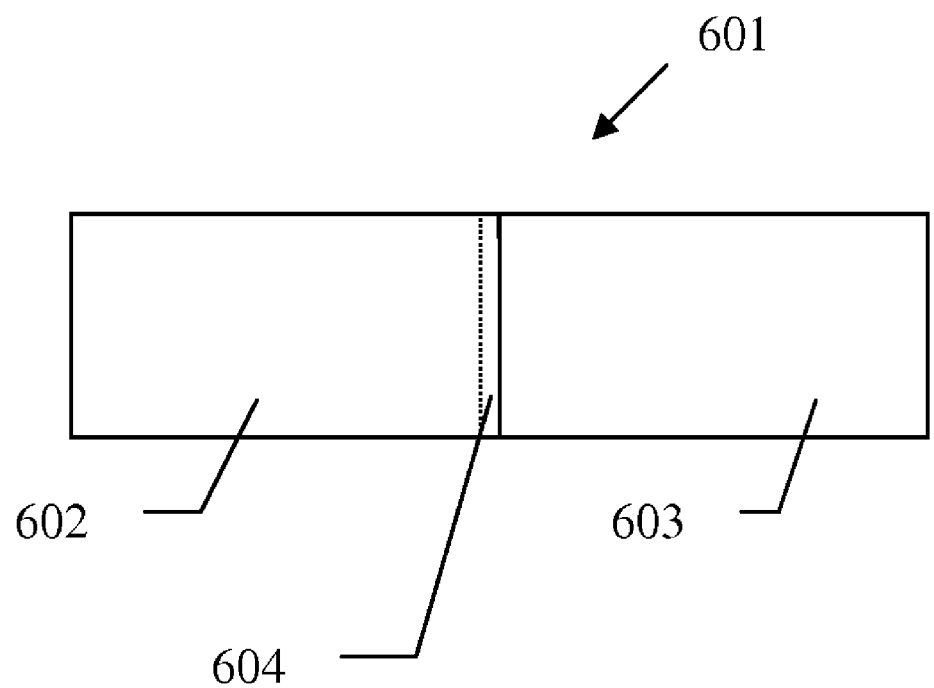
FIG. 6 is a diagram of a non-volatile memory for use in one embodiment of the invention.

The serial EEPROM 18 stores data in conformity to the Extended Display Identification Data (EDID) data structure specification. The EDID specification provides for an extension flag field that, when set to one, indicates that an additional 128 bytes of storage are available for storing display information. The first 128 bytes (the first memory portion) is used for storing display information, including the display resolution. FIG. 6 shows a logical view of the non-volatile memory 601 stored on EEPROM 18 (FIG. 1) including a first memory portion 602, a second memory portion 603, and an extension flag field 604.

In this embodiment, the touch panel controller is provided by Hampshire Company (trade mark), although any convenient touch panel controller may be used.

Figure 2:
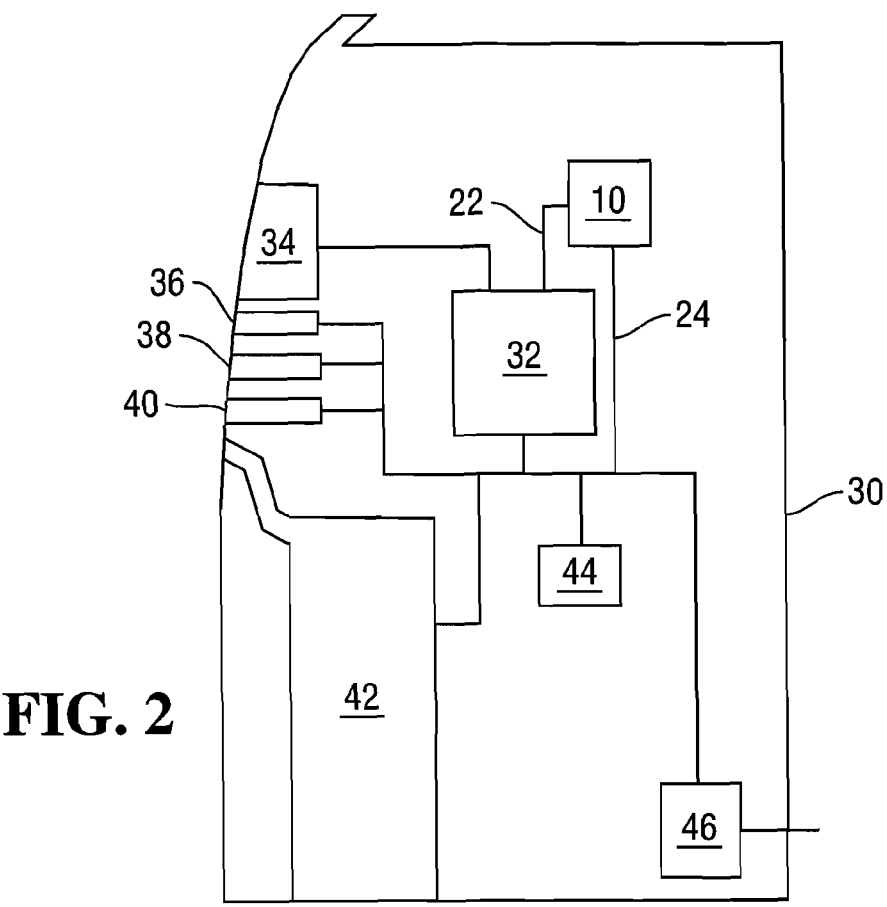
FIG. 2 is a schematic diagram of the touchscreen module of FIG. 1 mounted in a terminal.

Reference will now also be made to FIG. 2, which is a schematic diagram of the touchscreen module 10 mounted in a terminal 30 (in the form of an ATM). The ATM 30 comprises a plurality of modules for enabling transactions to be executed and recorded by the ATM 30. These ATM modules comprise: a controller module 32, a customer display 34, a card reader/writer module 36, an encrypting keypad module 38, a receipt printer module 40, a cash dispenser module 42, a journal printer module 44 for creating a record of every transaction executed by the ATM 30, a network connection module 46 for accessing a remote authorization system (not shown), and the touchscreen module 10 for use by a service operator (such as a field engineer, a replenisher, or the like).

Figure 3:
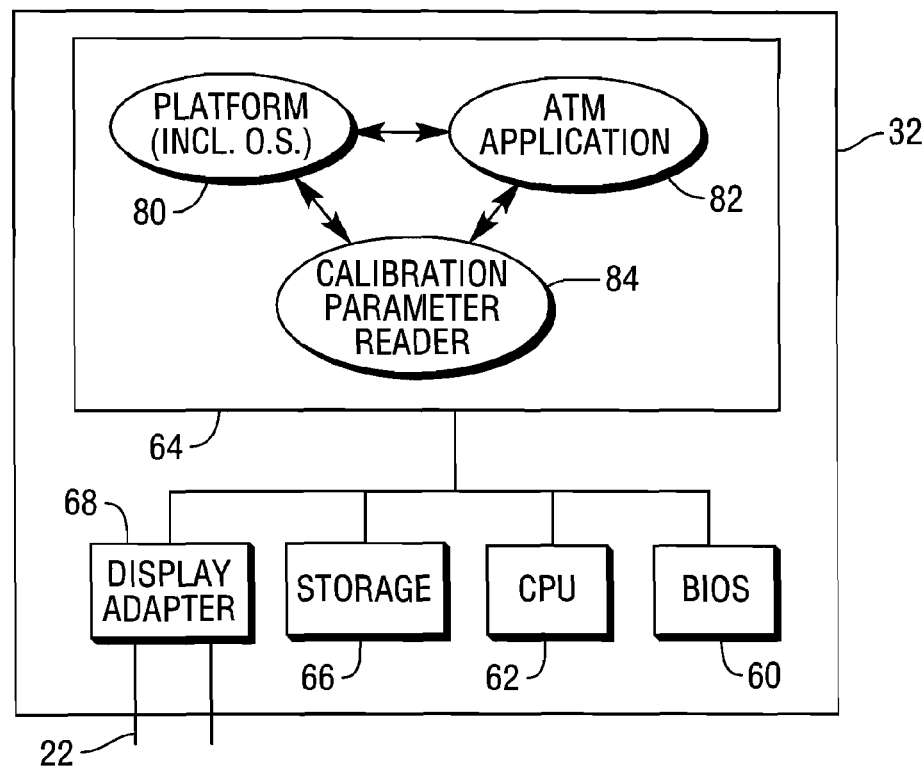
FIG. 3 is a simplified schematic diagram of a controller module for the terminal of FIG. 2.

Reference will now also be made to FIG. 3, which is a simplified schematic diagram of the controller module 32 of the ATM 30. The controller module 32 comprises a BIOS 60 stored in non-volatile memory (different to the EEPROM 18), a microprocessor 62, associated main memory 64, storage space 66 in the form of a magnetic disk drive, and a display controller 68 in the form of a graphics card. The graphics card 68 controls the display 12 in the touchscreen module 10 and also the customer display 34.

In use, the main memory 64 is loaded with a platform 80 (including an ATM operating system kernel and drivers for the modules in the ATM), and an ATM application 82. As is well known in the art, the operating system kernel is responsible for memory, task, process, task, and disk management.

The ATM application 82 is responsible for controlling the operation of the ATM 30. In particular, the ATM application 30 provides the sequence of screens used in each transaction (referred to as the transaction flow); monitors the condition of each module within the ATM (state of health monitoring); and obtains authorization for transactions from a remote transaction authorization system (not shown). In addition, the main memory 64 is also loaded with a calibration parameter reader routine 84, which will be described in more detail below.

Figure 4:
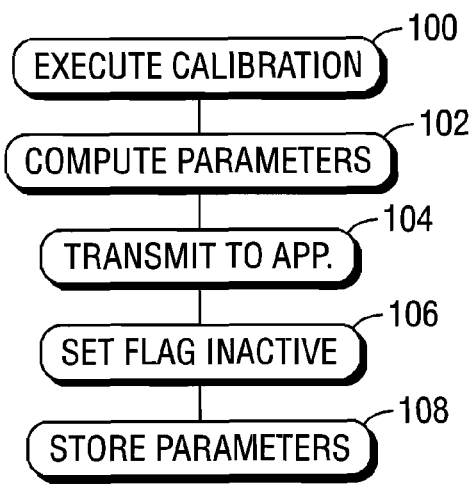
FIG. 4 is a flowchart illustrating steps involved in storing calibration parameters in the touchscreen module of FIG. 1.

Reference will now also be made to FIG. 4, which is a flowchart illustrating steps implemented by the touchscreen module 10 in storing calibration parameters therein. This process is first performed at the site of manufacture of the touchscreen module 10. Initially, a user executes a calibration process (step 100), which is a conventional process typically supported by touchscreen modules. During the calibration process, the touch panel controller 16 invites the user to touch a point on the touch panel 14 in registration with an object presented on the display 12. This process may involve the user being invited to touch points at each of the four corners of the touch panel 14, at the centre of the touch panel 14, or the like.

Based on the locations of the areas touched by the user, the touch panel controller 16 calculates calibration parameters to ensure that coordinates of the areas touched by the user correspond to coordinates of the areas presented on the display 12 (step 102).

Once these parameters have been calculated, the touch panel controller transmits these parameters to an external application (not shown) (step 104).

The external application then sets an extension flag inactive (set to zero) in the EEPROM 18 associated with the display 12 (step 106) using the graphics card 68 and its associated drivers and drivers for the display 12. The effect of this is to ensure that the drivers for the graphics card 68 and display 12 will not access the upper 128 bytes (the upper portion of memory) because they do not know that such memory is available. This leaves the upper portion of memory (a second memory portion) free for storing calibration parameters.

Once the extension flag has been set, the external application then transmits the calibration parameters to the EEPROM 18 and stores them in the upper portion of memory of the EEPROM 18 (step 108).

Once the manufacturer has stored the calibration parameters in the EEPROM 18, the manufacturer then ships the touchscreen module 10 to a customer, which may be a servicing company that services ATMs.

Figure 5:
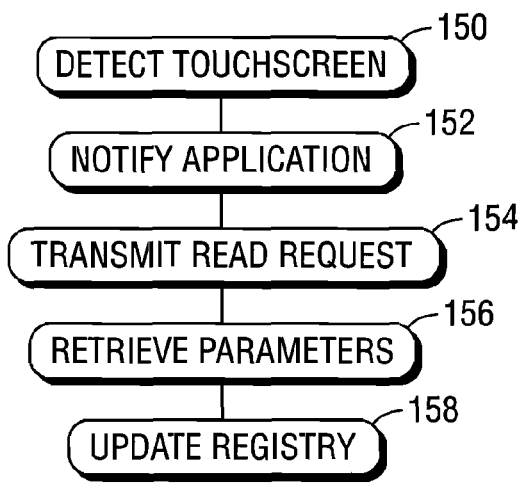
FIG. 5 is a flowchart illustrating steps involved in using calibration parameters read from the touchscreen module of FIG. 1.

If that servicing company needs to replace the touchscreen module 10 in the ATM 30, then a service engineer will take a new touchscreen module (very similar to touchscreen module 10, but probably with different calibration parameters) to the ATM 30 and remove the touchscreen module 10 and replace it with the new touchscreen module. When this occurs, the new touchscreen module will be detected automatically by the platform 80 and the calibration parameters stored therein will be used, as will be described now with reference to FIG. 5, which is a flowchart illustrating steps implemented by the ATM 30 in retrieving and using stored calibration parameters from the new touchscreen module.

The first step is for the platform 80 to detect the new touchscreen module (step 150). The platform 80 then notifies the calibration parameter reader application 84 that a new touchscreen module has been installed (step 152).

In response to this notification, the calibration parameter reader application 84 transmits a read request to the display driver and or graphics card driver (step 154).

In response to this read request, the graphics card and/or display drivers (not shown) retrieve the calibration parameters from the second memory portion (the upper 128 bytes of EEPROM 18) (step 156) via the conventional VGA cable 22 and the VGA interface 20.

The calibration parameter reader application 84 then conveys these calibration parameters to the ATM application 82, which writes these retrieved calibration parameters to the operating system registry in the platform 80 (step 158). The specific operating system registry entry that the parameters are written to is the touch panel controller registry entry.

Once the calibration parameters have been stored in the registry, the touch panel controller 16 will use these parameters to offset a detected touch point on the touch panel 14 in a conventional manner. This ensures that as soon as the new touchscreen module is installed in the ATM 30, it can be used by a service engineer without having to calibrate the touch panel 14 because it has been calibrated by the manufacturer.

If the calibration parameters are no longer sufficiently accurate, for example because the touch panel accuracy has drifted over time, then a service engineer can replace the stored calibration parameters. The service engineer can do this using a maintenance and diagnostic feature of the ATM application 82.

Conventional ATMs provide maintenance and diagnostic facilities to help service engineers repair, service, and replenish ATMs. For example, NCR Corporation (trade mark) provides a supervisor mode that can access a system application (SysApp) in the platform 80. Using this maintenance and diagnostic feature, a service engineer can invoke a calibration process that is very similar to a conventional calibration process.

This calibration process involves the touch panel controller 16 inviting the service engineer to touch a point on the touch panel 14 in registration with an object presented on the display 12. For example, this process may involve the user being invited to touch points at each of the four corners of the touch panel 14. Based on the locations of the areas touched by the user, the touch panel controller 16 calculates calibration parameters to ensure that the areas touched by the user correspond to the areas presented on the display 12.

Once the calibration parameters have been calculated, they are then transmitted to the ATM application 82, which writes these parameters to the operating system registry, and also conveys them to the calibration parameter reader application 84, which writes them to the upper memory portion of the EEPROM 18 using the display and/or graphics card drivers.

It will now be appreciated that this embodiment has the advantage that a touchscreen module is provided that includes its own calibration parameters in a memory that is required for containing display information, although the calibration parameters are stored in an area of that memory that is invisible to the graphics card and display drivers. The calibration parameters can be stored initially when the touchscreen module is manufactured so that it is ready to use when installed, and the calibration parameters can be updated when the touchscreen is in situ, to correct for any drift over time. Since reading from and writing to the non-volatile memory is controlled by the calibration parameter reader application 84, no change is required for the display driver or the graphics card driver.

Various modifications may be made to the above described embodiment within the scope of the invention, for example, the touchscreen module may be used as a customer display instead of, or in addition to, the service engineer display. In other words, two touchscreen modules may be provided in a terminal, such as an ATM; alternatively, one touchscreen module may be used by both customers and service engineers.

In other embodiments, the terminal may not be an ATM, it may be an information kiosk, a financial services centre, a bill payment kiosk, a lottery kiosk, a postal services machine, a check-in and/or check-out terminal such as those used in the retail, hotel, car rental, gaming, healthcare, and airline industries, or the like.

In other embodiments a DVI interface may be used instead of a VGA interface.

In other embodiments, an RS232 interface, or any other convenient communications bus, may be used instead of a USB connection.

In the above embodiment, a display controller in the form of a graphics card 68 was used. In other embodiments, the display controller may be integrated onto a motherboard, or provided in some other form factor. Where two or more touchscreen modules are provided, multiple display controllers may be used, or just one display controller may be used with multiple ports.

In other embodiments, instead of using the graphics card driver and/or display driver, the calibration parameter reader routine 84 may access the non-volatile memory 18 directly to write data to and read data from that memory 18.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. A touchscreen module comprising:
   a display for presenting information to a user of the touchscreen module;
   a touch panel mounted in overlapping relationship with the display;
   a touch panel controller coupled to the touch panel for detecting a point on the touch panel touched by the user; and a display controller coupled to the display and comprising a display driver;

wherein the display controller further comprises a 256-byte EEPROM, the EEPROM having a first memory portion in the lower 128 bytes and a second memory portion in the upper 128 bytes, wherein the EEPROM complies with the Extended Display Identification Data data structure, wherein the first memory portion is adapted to store display information related to said display, including display resolution information, wherein the second memory portion is adapted to store calibration information related to said touch panel, wherein the first memory portion comprises an extension flag set to zero indicating that the second memory portion contains no display information, and wherein the display driver is adapted to read the extension flag and ignore the information contained in the second memory portion if the extension flag is set to zero.

2. A touchscreen module according to claim 1, wherein the EEPROM is compatible with an I$^2$C bus.

3. A touchscreen module according to claim 1, wherein the first memory portion stores a manufacturer's name and a product type.

4. A method of storing calibration data for a touch panel in a touchscreen module comprising a display, a touch panel, a touch panel controller, and a display controller having a 256-byte EEPROM, the EEPROM having a first memory portion in the lower 128 bytes and a second memory portion in the upper 128 bytes, the method comprising:

setting an extension flag in the first memory portion of the EEPROM to indicate that the second memory portion of the EEPROM contains no display information;

implementing a calibration process to ascertain calibration parameters; and storing the ascertained calibration parameters in the second memory portion of the EEPROM, wherein the first memory portion of the EEPROM is adapted to store display information capable of being read by a display driver resident in a memory of said display controller, and wherein said display driver is adapted to read the extension flag and ignore the information contained in the second memory portion if the extension flag is set to zero.

5. A method according to claim 4, the method further comprising:

reading the ascertained calibration parameters from the second memory portion, and providing the read calibration parameters to an operating system.

6. A terminal including a touchscreen module comprising:

a display for presenting information to a user of the touchscreen module;

a touch panel mounted in overlapping relationship with the display;

a touch panel controller coupled to the touch panel for detecting a point on the touch panel touched by the user; and a display controller coupled to the display and comprising a display driver;

wherein the display controller further comprises a 256-byte EEPROM, the EEPROM having a first memory portion in the lower 128 bytes and a second memory portion in the upper 128 bytes, wherein the EEPROM complies with the Extended Display Identification Data data structure, wherein the first memory portion is adapted to store display information related to said display, including display resolution information, wherein the second memory portion is adapted to store calibration information related to said touch panel, wherein the first memory portion comprises an extension flag set to zero indicating that the second memory portion contains no display information, and wherein the display driver is adapted to read the extension flag and ignore the information contained in the second memory portion if the extension flag is set to zero.

7. A terminal according to claim 6, wherein the terminal further comprises a cash dispense module.

8. A terminal according to claim 6, wherein the terminal includes a software platform having an operating system, and a terminal application for controlling operation of the terminal.

9. A terminal according to claim 8, wherein the terminal includes an application that communicates with one or more drivers in the software platform to request information from, and write information to, the second memory portion.

* * * * *